Patented Apr. 29, 1947

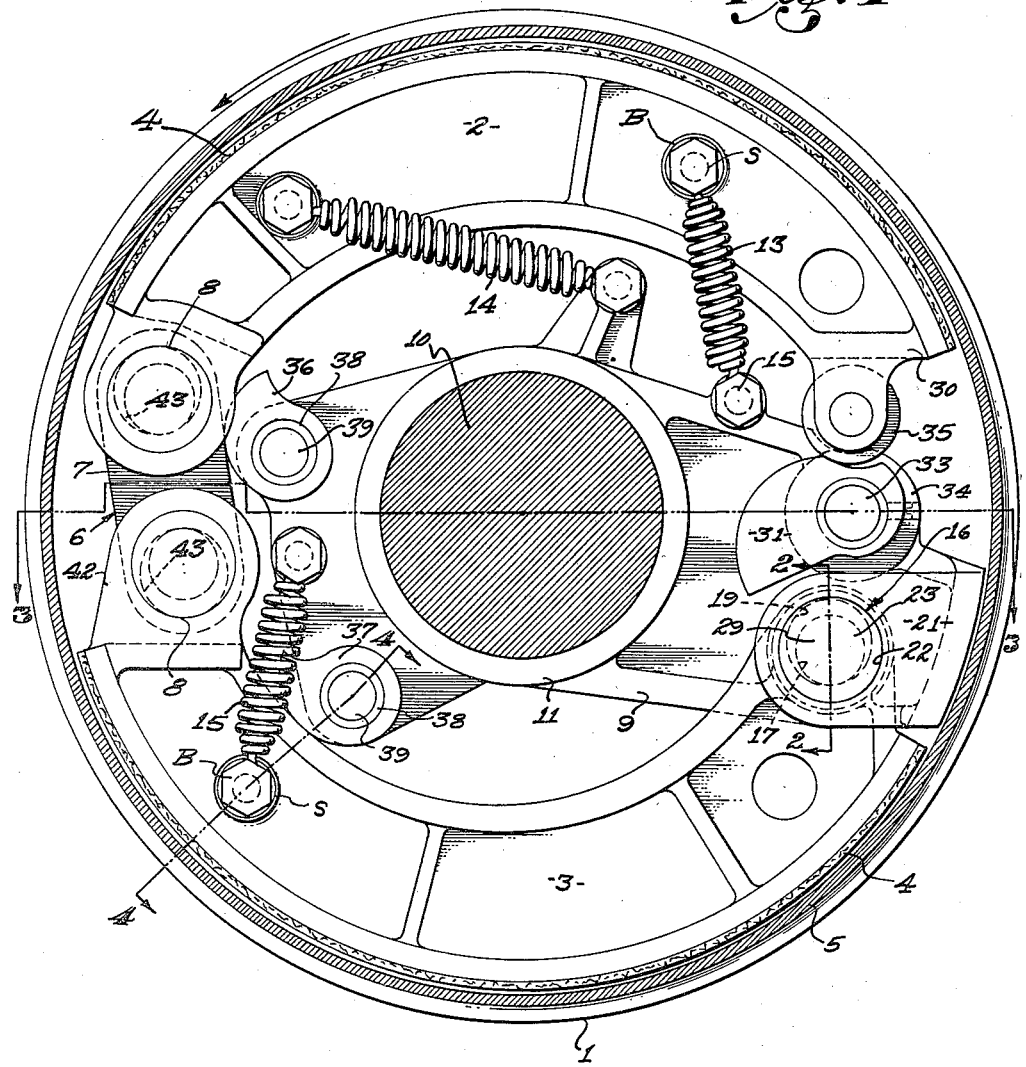

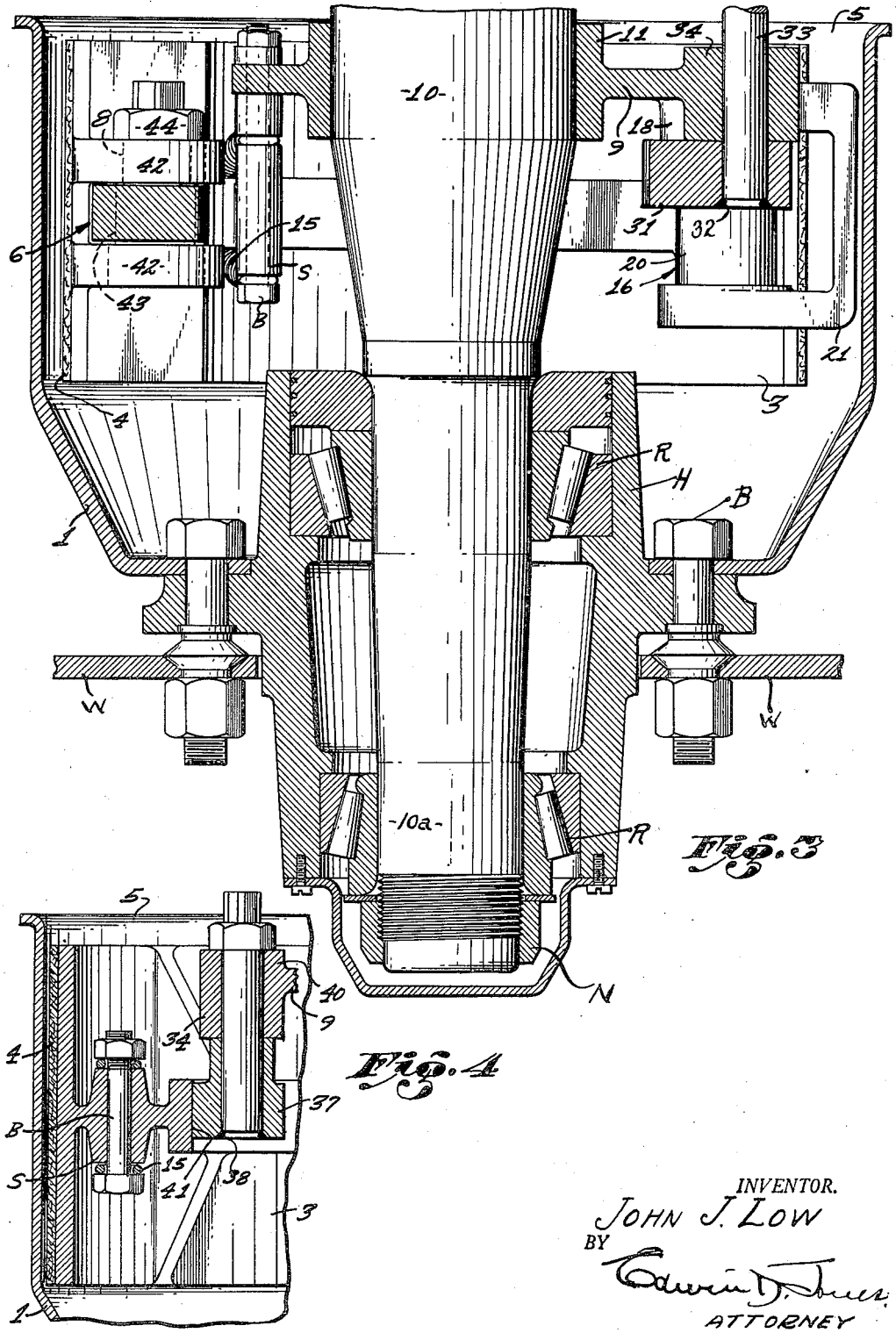

2,419,784

UNITED STATES PATENT OFFICE 2,419,784

BRAKE

John J. Low, Los Angeles, Calif., assignor to Kay-Brunner Steel Products, Inc., a corporation of Delaware Application August 21, 1944, Serial No. 550,405

4 Claims. (Cl. 188—78)

1

My invention relates to brakes and particularly, although not necessarily, to internal expanding brakes for vehicles.

A purpose of my invention is to provide means for mounting the brake shoes in such manner that when an initial force is applied to press one of the brake shoes against the drum, the drag force exerted by the drum on that shoe will be imparted to the other brake shoe or shoes, thereby attaining a self-energizing or servo effect, operating to greatly increase the braking action.

Another purpose of my invention is to mount the brake shoes, and connect them together in such a way that the cooperating effect of the brake shoes can be regulated and adapted to changing conditions of the brake lining.

Another purpose of my invention is to provide an internal type of brake in which the braking force is equalized between the different brake shoes that are pressed against the inside of the brake drum.

Another purpose of my invention is to provide a brake of this type employing pivotal connections constructed in such a way that the axes of the pivotal connections can be regulated to adapt the brake shoes to changing conditions of the brake lining.

A further purpose of my invention is the provision of a brake particularly adapted to vehicles in that the mounting of the brake shoes is such as to produce the self-energizing or servo action in either direction of rotation of the drum as when the vehicle is moving forwardly or rearwardly.

I will describe only one form of brake embodying my invention, and will then point out the novel features thereof in claims.

In the drawing:

Fig. 1 is a cross-section through the drum of a brake assembly embodying my invention, and showing, by way of example, a type of brake employing a pair of oppositely disposed brake shoes.

Fig. 2 is a section on the line 2—2 of Fig. 1 illustrating typical means I prefer to employ for effecting an adjustment of a pivotal connection of one of the brake shoes, and which I employ at different points of the brake assembly.

Fig. 3 is a section taken on the line 3—3 of Fig. 1 further illustrating the brake assembly shown in Fig. 1.

Fig. 4 is a cross-section taken on the line 4—4 of Fig. 1 and further illustrating details of a cam and its mounting, together with the anchor bolt for two springs that I prefer to employ for holding one of the brake-shoes in drum disengaging position.

Before proceeding to a more detailed description of the invention it should be stated that all brakes that carry brake linings to develop the braking force when pressed against a rotating drum or flange are subject to considerable variation as to thickness and as to the condition of the liner surfaces that come against the drum surface when the brakes are applied. And when the brake assembly includes brake shoes that press against the drum surface it is most important to have the pressure of the brake shoes against the brake drum equalized as far as possible. Otherwise this pressure tends to force the drum flange "out of round." This would necessitate truing up the brake drum from time to time.

In order to meet these requirements, in applying my invention to a brake drum 1 of common form, I provide two or more brake members in the form of brake shoes 2 and 3 which are of arcuate form and provided with brake linings 4 of any suitable material, conforming to the curvature of the inside surface of the flange 5 of the brake drum.

The brake shoe 2, as illustrated in Fig. 1, is a "floating" part, that is to say it is preferably not positively guided in its movement when it is pressed outward against the brake flange, but is free to adapt itself to the curvature of the drum flange. In the present instance, the adjacent end portions of the brake shoes 2 and 3 are attached to each other by a connection or joint 6 including a strut link 7 with pivotal connecting pins 8. This link 7 is free floating, that is, it is unconnected to a fixed support.

The brake shoes 2 and 3 are supported on a bracket 9 integral with a hub 11 which is fixedly secured in any suitable manner, such as by welding, to an axle 10. In Fig. 3, the outer end 10a of the axle is reduced in diameter and shaped to receive the parts of a conventional roller bearing structure generally indicated at R, confined on the axle by a nut N, and by which a hub H is journaled on the axle. Secured to the hub H by bolts B is the drum 1, and the bolts are also employed to secure the hub to a wheel W, only a portion of which has been shown.

Yielding means preferably including a plurality of coil springs 13, 14, and 15, are provided and these are attached to the shoes and to the bracket 9 for normally pulling the brake shoes in to maintain them in their position of rest that is, in their "off" position. The springs are preferably employed in pairs, located on opposite sides of the bracket 9, and secured at their ends to bolts B secured in sleeves S formed integral with the shoes 2 and 3. The end of the brake shoe 3 is connected to the bracket 9, in the present instance, by a pivot pin 16. This pin has a shank or neck 17 of reduced diameter that fits into a drilled socket in a boss 18 on the bracket 9 (see Fig. 2), and has an eccentric body 19 mounted for free rotation in an eye or boss 20 formed on the shoe 3. At this point the bracket is formed with an integral out-board extension or fork 21 having an opening 22 therein that is coaxial with the shank 17 and receives loosely, a head 23 formed on the outer end of the pin 16.

By reason of the larger diameter of the eccentric body 19 of the pin 16 a shoulder 24 is formed that seats against the end of the boss 18 and enables the pin 16 to be secured by means of a washer 25 under a clamping nut 26 on threads 27 at the inner end of the shank 17. The shank 17 may have a tip 28 of reduced diameter to act as a centering guide for facilitating placing the shoe 3 in the assembly. By loosening up the nut 26, the pin 16 can be rotated on its axis 29, thereby altering the position of the eccentric body 19 so as to adjust this anchored end of the shoe 3 toward or away from the brake flange 5.

The brake is applied by exerting an initial turning force on the unconnected end 30 of the brake shoe 2, and this is preferably accomplished through the agency of a cam 31 welded as at 32 to a brake shaft 33 rotatably supported in a bearing 34 formed as a boss on the bracket 9 (see Fig. 3). For ease of operation and to avoid wear, the cam face of the cam 31 may thrust against a roller 35 carried on the end of the brake shoe 2.

The position of the shoes 2 and 3, when in their position of rest, is determined by adjustable rests including normally fixed but adjustable cams 36 and 37 (see Figs. 1 and 4). Each of these cams is secured, as by a weld 38 (see Fig. 4), to a bolt or pin 39 attached in a socket 40 formed on the bracket 9. The cam 36 is mounted in the same manner as the cam 37. The inner arc or face 41 of the shoe 3 rests against the cam surface of the cam 37 while the inner side of the strut link 7 rests against the cam surface of cam 36.

The pivot pins 8 that attach the ends of the strut link 7 to the adjacent ends of the shoes 2 and 3 are mounted in lugs 42 on the ends of the shoes (see Fig. 3); and they are formed with eccentric bodies 43 loose in the ends of the link so that by loosening up their nuts 44 they can be secured in any new position. As the brake liners 4 wear down, these adjustments would move the link 7 outwardly toward the flange 5, and the cam 37 would also adjust the adjacent end of the shoe 3 outwardly.

The direction of rotation of the drum 1 is indicated by the arrow in Fig. 1, as when the vehicle upon which the brake is adapted to be mounted, is travelling forwardly. Now when the initial brake force is exerted by the cam 31 to apply the brakes, as soon as the lining at the right end of this shoe 2 as shown in Fig. 1, comes against the drum flange 5, the friction against the flange develops a drag force tending to rotate this brake shoe 2 with the flange. This pulls the left end of the brake shoe 2 into contact with the drum and this develops an increased drag force that acts against the pin 8 at the upper end of the link 7, forcing the link down and moving the adjacent end of the shoe 3 against the drum by rotating it about its fixed pivot pin 16. As soon as the shoe 3 seats against the drum flange 5 it stops the downward movement of the link and resists its further movement. As the action and reaction of a force are equal and opposite it will be evident that the link 7 is now in compression forcing the shoe 2 upward and the shoe 3 downward. In this way, once the relatively small force is exerted to start the movement of the brake shoe 2 against the drum, the braking action from then on becomes self generating.

If the brake is applied while the vehicle is moving back, the brake assembly still has a self generating braking effect. In this case the direction of rotation will be opposite to that indicated by the arrow in Fig. 1. Now when the cam 31 forces the right end of the brake shoe 2 against the device, the frictional pull and drag force acting on the shoe is toward the right. This imparts a pull from the shoe 2 to the upper pin 8, causing this pin to move upwardly and toward the right. The link 7 then rocks like a lever on its point of contact with the cam 36 as a fulcrum, thereby causing the lower end of the link 7 to swing toward the left, and this, of course, swings the shoe down on its pivot pin until it seats against the drum.

The performance of the brake can be nicely regulated by adjusting the position of the eccentric bodies 43 of the pins 8. This enables the angle or inclination of the link with respect to shoes to be adjusted as may be desired. And cooperating with the adjustable pins 8 is the cam 39 that can be fixed in any desired adjusted position to regulate the position of the shoes in their position of rest. That is to say, when the brakes have just been relined, the cam 36 would be adjusted to a position in which the faces of the linings would be sufficiently clear of the drum. As the brake linings become worn, the cam 36 would be adjusted more or less by setting further to the left to compensate for wear of the brake linings.

Although I have herein shown and described only one form of brake embodying my invention, it is to be understood that various changes and modifications may be made therein without departing from the spirit of my invention and the spirit and scope of the appended claims.

I claim:

1. In a brake, the combination of a relatively fixed bracket; a brake drum; a pair of brake shoes supported on the bracket; means for moving one of said shoes into contact with the drum enabling the drum to exert a drag force upon the same; a free floating strut link connecting said shoes moved by the drag force to impart a thrust force to the other shoe to apply it to the brake drum, during the forward rotation of the drum; and adjustable means engaging the side of said link and operating as a fulcrum enabling the link to act as a lever to impart the braking force to the said other brake shoe when the drum is rotating in a reverse direction.

2. In a brake, the combination of a relatively fixed frame member; a rotary brake member having a brake flange; a pair of oppositely disposed arcuate brake shoes with brake linings to be applied to the flange; connecting means including a strut link for connecting the brake shoes together at adjacent ends; means for pivotally mounting the other end of one of said brake shoes on the frame member; means mounted on the frame member for exerting an initial force to press the opposite brake shoe adjacent its unconnected end outwardly against the flange, and thereby imparting a thrust force through the strut link from one of the brake shoes to the other; and a cam rotatably mounted on the frame member engaging the side of the strut link for adjusting its angle and line of thrust of the thrust force between the brake shoes to adapt the coaction of the strut link to the condition of the brake lining.

3. In a brake, the combination of a rotary brake member having a flange; a pair of oppositely disposed brake shoes having linings thereon, and capable of being pressed outwardly against said flange; a strut link; a pivotal connection at each end of the strut link connecting the same to adjacent ends of the brake shoes; each of said pivotal connections including an adjusting eccentric unconnected to the other eccentric and disposed on the axis of the pivot connection; and each of said eccentrics being adjustable independently of the other to alter the direction of the thrust force exerted between said shoes through said link.

4. In a brake: a relatively fixed frame member; a rotary brake drum with a flange; a brake shoe pivoted at one end on said member; a floating brake shoe; a cam rotatably mounted on said member between one end of said shoes and engaging one end of said floating shoe for expanding the latter into engagement with said flange and thereby applying an initial thrust force to said shoe; a strut link; pivotal connections between the ends of said link and the other ends of said shoes, each connection including an eccentric with means for adjusting it independently of the other eccentric to alter the angle and line of thrust exerted by said link on said pivoted shoe from said floating shoe; and a cam rotatably mounted on said member to engage said link for adjusting said floating shoe in relation to said flange; and a second cam rotatably mounted on said member to engage said pivoted shoe for adjusting the latter in relation to said flange.

JOHN J. LOW.

REFERENCES CITED

The following references are of record in the file of this patent:

UNITED STATES PATENTS

| Number | Name | Date |
| --- | --- | --- |
| 1,668,211 | Krieg | May 1, 1928 |
| 1,694,776 | Flanigan | Dec. 11, 1928 |
| 1,757,011 | Flanigan | May 6, 1930 |
| 1,799,227 | Gunn | Apr. 7, 1931 |
| 1,825,653 | Cautley | Oct. 6, 1931 |
| 1,900,178 | Frank | Mar. 7, 1933 |

FOREIGN PATENTS

| Number | Country | Date |
| --- | --- | --- |
| 684 252 | French | Mar. 17, 1930 |